United States Patent [19]
Hill

[11] Patent Number: 4,724,746
[45] Date of Patent: Feb. 16, 1988

[54] TILTING BEARING PADS FOR IMPROVED LUBRICATION

[75] Inventor: Alfred Hill, Bath, England

[73] Assignee: AE plc, England

[21] Appl. No.: 65,630

[22] Filed: Jun. 25, 1987

Related U.S. Application Data

[63] Continuation of Ser. No. 698,428, Feb. 5, 1985, abandoned.

[30] Foreign Application Priority Data

Feb. 10, 1984 [GB] United Kingdom ............... 8403522

[51] Int. Cl.⁴ .................................................. F16J 1/06
[52] U.S. Cl. ........................................................ 92/207
[58] Field of Search .................. 92/192, 193, 201-203, 92/205-207, 174, 178, 182, DIG. 1, DIG. 2

[56] References Cited

U.S. PATENT DOCUMENTS

| | | | |
|---|---|---|---|
| 3,150,570 | 9/1964 | Johnson et al. | 92/DIG. 2 |
| 3,335,643 | 8/1967 | Wentworth | 92/182 |
| 3,359,872 | 12/1967 | Foster | 92/201 |
| 3,442,183 | 5/1969 | Howe et al. | 92/193 |
| 3,759,148 | 9/1973 | Geffroy | 92/200 |
| 4,158,328 | 6/1979 | Beardmore | 92/203 |
| 4,178,899 | 9/1978 | Julich | |
| 4,286,828 | 9/1981 | Sides et al. | 308/26 |

FOREIGN PATENT DOCUMENTS

| | | |
|---|---|---|
| 0071361A | 7/1982 | European Pat. Off. |
| 1625985 | 7/1966 | Fed. Rep. of Germany |
| 1451882 | 10/1965 | France |
| 2308028 | 4/1975 | France |
| 912232 | 12/1962 | United Kingdom |
| 971407 | 9/1964 | United Kingdom |
| 977753 | 12/1964 | United Kingdom |
| 1511538 | 5/1978 | United Kingdom ........... 92/193 |

Primary Examiner—Edward K. Look
Attorney, Agent, or Firm—Leydig, Voit & Mayer

[57] ABSTRACT

A reciprocating machine component, such as a piston of an internal combustion engine or a compressor, is provided with bearing pads for transmitting lateral thrust to an associated guide surface, such as a cylinder or liner. The bearing pads are mounted such that they tilt during reciprocation in order to provide a wedge-shaped lubricant film between the pad and the surface. The mounting is also such as to ensure that the direction of tilt of the pads changes with the direction of reciprocation.

21 Claims, 17 Drawing Figures

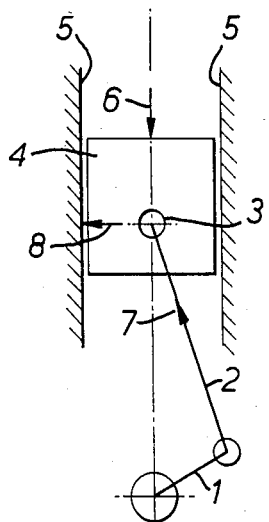
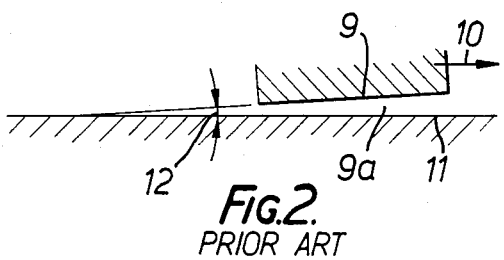
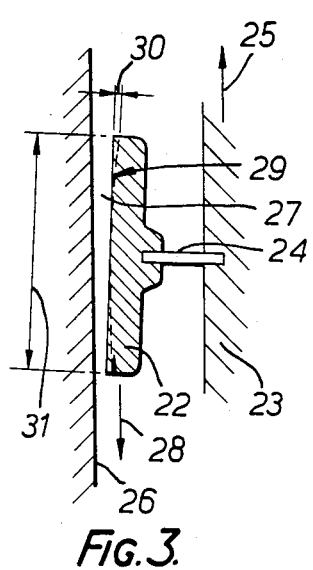
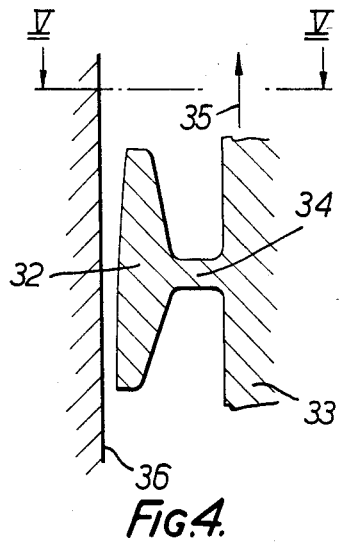
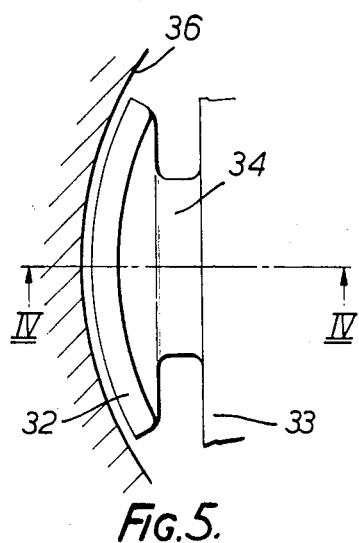

TILTING BEARING PADS FOR IMPROVED LUBRICATION

This application is a continuation of application Ser. No. 698,428, filed Feb. 5, 1985 now abandoned.

BACKGROUND TO THE INVENTION

1. Field of the Invention

This invention relates primarily to machines such as pistons and crossheads in reciprocating engines, compressors and pumps but is applicable to any machine employing a reciprocating sliding motion.

2. Review of the Prior Art

Referring to the drawings:

FIG. 1 is a diagrammatic side elevation of a prior art reciprocating machine including a piston or crosshead, and FIG. 2 is a diagrammatic view of the prior art piston or crosshead of FIG. 1 inclined relative to an associated guide surface to illustrate a convergent wedge-shaped film.

The machine of FIG. 1 has a rotating crank 1 and connecting rod 2 are linked by a pivot 3 to a piston or crosshead 4 which reciprocates in a cylinder or guide 5. The force 6 along the line of action of the piston combines with the connecting rod force 7 to produce a resultant lateral force 8. The sliding speed of the piston or crosshead 4 varies approximately sinusoidally from zero at each end of the stroke, where the direction reverses, to a maximum value near the mid point. The lateral force 8 also varies cyclically, its magnitude and direction depending upon the particular type of machine. For example, in most internal combustion engines now manufactured, the lateral force on the piston reverses at the end of the stroke causing the piston to cross over from one side of the cylinder to the opposite side.

As a result of long practical experience the specific loading of guide surfaces on conventional pistons and crossheads is very low compared with that on the rotating bearings, commonly one-tenth or less.

Specific loading is defined as the applied force divided by the area over which it is distributed, projected in the direction of the force-that is $$\text{Specific Loading} = \frac{\text{Force}}{(\text{Diameter or width}) \times \text{Length}}$$

To obtain a low specific loading relatively large surfaces are required and these cause a concomitant frictional drag due to the shearing of the film of lubricating oil between the surfaces. Any reduction in this friction will increase the mechanical efficiency of the machine and, in the case of an engine, will reduce the fuel consumption for a given power output.

The theory and practice of lubrication confirm that parallel sliding surfaces have a limited specific load capacity and tend to also have limitations to the sliding velocity which may safely be applied and this applies to the guide surfaces already described.

Both specific loading and sliding speed capacities can be greatly increased if the surfaces are inclined very slightly so that a converging film of lubricant is formed. FIG. 2 illustrates this convergent, or wedge-shaped film 9a essental to high performance, where a surface 9 slides over a guide surface 11 in the direction of arrow 10. For optimum performance the angle 12 between the surfaces will generally be between 0.0001 and 0.01 radian.

Thus, if the sliding surface of component 4 were to be inclined relative to the non-operating surface, the lubrication would be improved, specific loading could be increased allowing a reduction in area and thereby reducing the frictional drag. An improvement in mechanical efficiency would ensue. Two inclinations would be required, one for each direction of sliding, and the no-operating surface would still contribute to frictional drag, but there could still be a net gain over conventional designs. However, a fixed inclination is only suitable for a narrow range of speed and specific load conditions whereas the piston or crosshead 4 can in many cases be subject to widely varying speed and load conditions, each cyclical in nature but not always in step.

SUMMARY OF THE INVENTION

According to the invention, there is provided a piston for an internal combustion engine, the piston being mounted in a cylinder for reciprocating sliding movement on the cylinder surface with a fluid lubricant therebetween, the piston being provided with two or more bearing pads so pivotally supported that each pad tilts during said reciprocating sliding movement for forming between the piston and the cylinder surface a fluid pressure wedge of lubricant whose leading edge at any instant has the greater thickness.

BRIEF DESCRIPTION OF THE DRAWINGS OF THE EMBODIMENTS OF THE INVENTION

The invention may be carried into practice in various ways and some embodiments will now be described, by way of example, with reference to FIGS. 3 to 17 of the accompanying drawings, in which:

FIG. 3 is a diagrammatic section of a first form of reciprocating machine comprising a bearing pad mounted for reciprocating sliding motion on a co-operating guide surface, FIG. 4 is a section on line IV—IV in FIG. 5 through a practical embodiment of the machine of FIG. 3, in the form of a piston for an internal combustion engine or compressor, FIG. 5 is a view on the line V—V in FIG. 4, FIG. 6 shows bearing pads of the kind shown in FIGS. 3 to 5 forming part of a piston for an internal combustion engine or a compressor reciprocable in a cylinder or liner, and is a section on the line VI—VI in FIG. 7, FIG. 7 is a section on the line VII—VII of FIG. 6, FIG. 8 is a diagrammatic section of a second form of reciprocating machine comprising a bearing pad mounted for reciprocating sliding motion on a co-operating guide surface, FIG. 9 is a schematic representation of the bearing pad of FIG. 8 for use in demonstrating how tilting of the pad occurs, FIG. 10 shows a reciprocating machine in the form of a crosshead incorporating the second form of bearing pad shown in FIGS. 8 and 9, FIG. 11 shows a first way in which lubricant can be supplied to bearing pads of the kind shown in FIGS. 3 to 5, FIG. 12 shows an alternative way of supplying lubricant to bearing pads of the kind shown in FIGS. 3 to 5, FIG. 13 is a diagrammatic section of a third form of reciprocating machine comprising a bearing pad mounted for reciprocating sliding motion on a cooperating guide surface, FIG. 14 is a section on the line XIV—XIV in FIG. 13, FIG. 15 shows a first method of lubricating a cup for supporting the bearing pad shown in FIGS. 13 and 14, FIG. 16 shows a second method of lubricating a cup for supporting the bearing pad shown in FIGS. 13 and 14, and FIG. 17 shows bearing pads of the kind shown in FIGS. 13 to 16 incorporated into a piston for an internal combustion engine or compressor.

DESCRIPTION OF THE PREFERRED EMBODIMENTS

Figure 6:
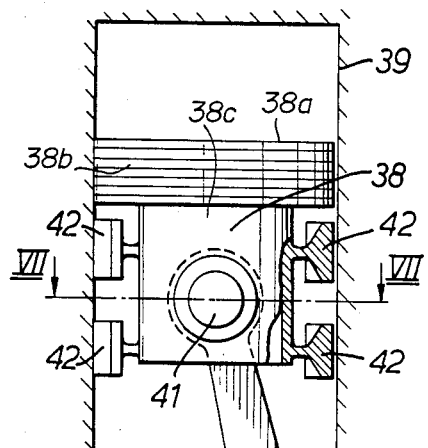

Referring to FIGS. 3 to 5, the first form of reciprocating machine includes a pad 22 attached to a reciprocating component 23 by a column or strip 24, rigidly attached to both the pad 22 and the component 23 but able to flex to allow pad 22 to tilt as indicated when the direction of motion is as shown by arrow 25. The pad co-operates with a stationary guide surface 26 with a lubricant therebetween. The frictional force caused by the viscous shear or drag in the lubricant film 27 acts in the direction of arrow 28. The direction of tilt will reverse, as the direction of motion reverses.

It will be appreciated that the hydrodynamic force causing the pad to tilt is opposed by the frictional force 28 and also by the stiffness of the column 24 so that although tilt occurs it will be less than optimal. The hydrodynamic force can be increased by a very slight crowning of the pad surface as illustrated by the dotted line 29, the amount of crowning 30 being less than 1/200 of the length 31 of the pad face.

Figure 7:
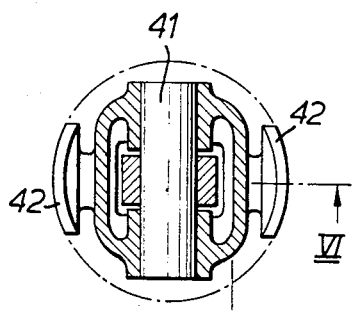
Figure 8:
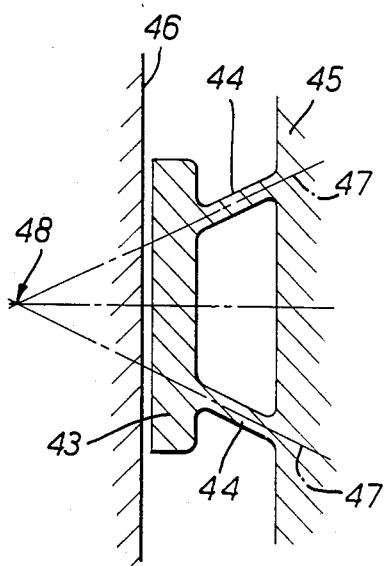
Figure 9:
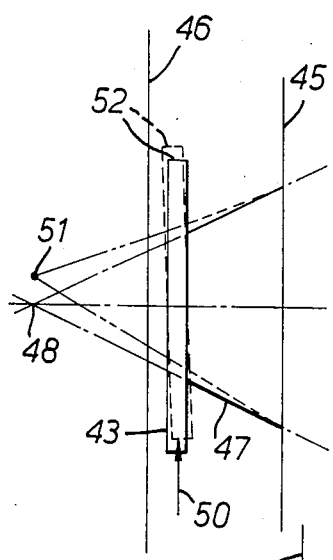
Figure 10:
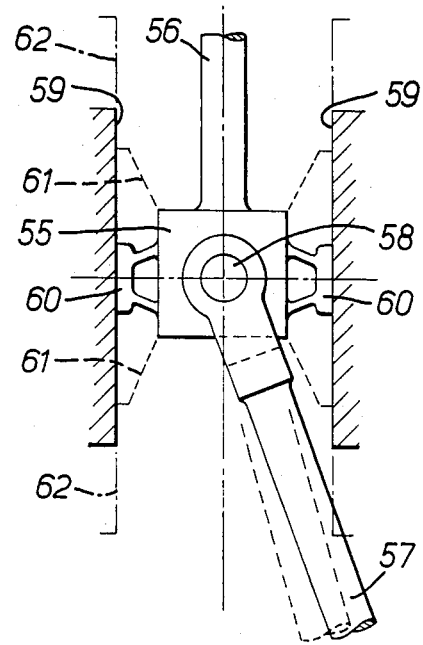

FIGS. 4 and 5 show a practical application of this embodiment to a piston for an internal combustion engine or compressor where the pads 32 and flexing column 34 are integral with the piston 33, which is moving instantaneously, in the direction of the arrow 35, along a co-operating cylinder bore 30. FIGS. 6 and 7 further illustrate this application. The piston 38 reciprocates in a cylinder 39 and is pivotally attached to connecting rod 40 by a gudgeon pin 41. The piston 38 includes a crown 38a, a ring band 38b disposed around the periphery of the crown 38a, and a skirt 38c which is operatively connected to the crown 38a either directly or indirectly through the ring band 38b. The gudgeon pin 41 is disposed in a gudgeon pin bore in the skirt 38c below the ring band 38b. The lateral forces are carried by two tilting pads 42 at each side of the piston; it being understood that whilst, in this example, two are shown on each side of the piston, any larger number may equally be used. The second form of reciprocating machine includes a bearing pad 43 and is shown in FIGS. 8 to 10. The pad 43 is supported on two inclined flexing columns 44 which is connected to the component 45 which has relative sliding motion along the surface 46. The columns 44 are spaced in the direction of relative motion of the component 45 and the surface 46 and are inclined so that their axes 47, when produced, meet at a point 48 on the opposite side of the pad face from the columns.

The effect of this arrangement is illustrated diagrammatically in FIG. 9. If the component 45 carrying the pad 43 is considered to be moving in the direction of arrow 49 over the stationary surface 46, then the frictional drag force on the pad will act in the direction of arrow 50. The pad 43 and the column axes 47 will deflect to the positions shown by the dotted lines, causing the pad to adopt a tilted position. At the same time the point of intersection 48 of the column axes produced will move to the position indicated at 51. Since the movement from 48 to 51 is, by geometry, greater than the deflection of the pad 43, to a degree dependent on the angle between the column axes 47, the effective center of support of the pad moves towards the trailing edge 52.

It is known from lubrication theory that this will improve the film conditions. Thus the frictional force and the hydrodynamic force act in unison to cause flexing of the support columns. The geometric proportions can be selected to optimise the film lubrication conditions to suit each individual application.

As a matter of convenience more than two flexing columns may be used, providing that their axes when produced all meet at the same point, on the opposite side of the pad face from the columns.

Referring next to FIG. 10, the reciprocating machine shown therein comprises a crosshead 55 rigidly connected to a piston rod 56 which, in turn, is connected to the remainder of the piston. The crosshead 55 is pivotally attached to a connecting rod 57 by a pin 58. The pin 58 is disposed in a gudgeon pin bore in the crosshead 55. The crosshead 55 reciprocates in guides 59 which may be of either cylindrical or flat form as desired. The lateral force is carried by a pad 60 on each side, although more than one pad may be fitted if desired. The pads 60 are of the kind shown in FIG. 8 and 9. By way of comparison the dotted lines 61 indicate the shape of a crosshead of conventional form, requiring the length of the guides to be increased as indicated by the dotted lines 62. Thus there is the benefit of a substantial reduction in the length of the crosshead guides, which may also permit a shorter connecting rod to be used so providing a useful saving in the overall height of the machine and a corresponding reduction in weight and cost.

Figure 11:
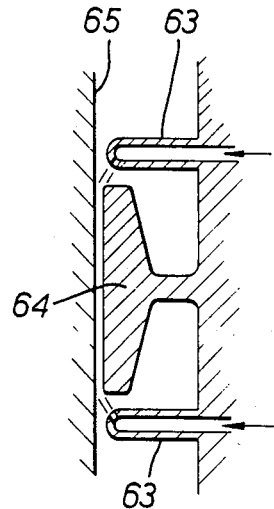

In many applications, the conventional splash lubrication will provide sufficient lubricant to the surfaces of the pad and the co-operating guide surface, to provide an adequate hydrodynamic film. But this may not be the case in other machines, notably slow speed engines, and a separate supply of lubricant will be necessary. Such may be arranged as shown in FIG. 11 where the lubricant is directed by sprayers or nozzles 63 to the alternate leading edges of the pad 64 as it reciprocates over the guide surface 65.

Figure 12:
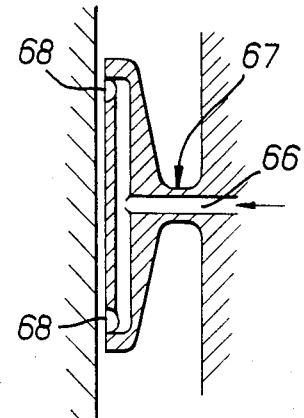
Figure 13:
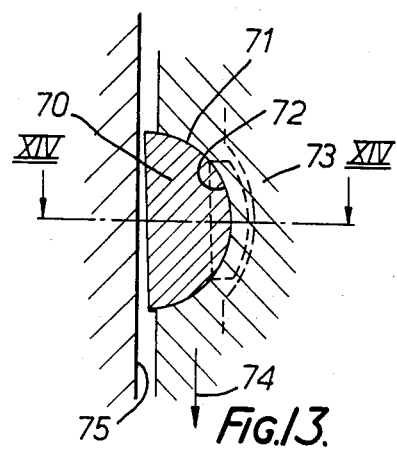

FIG. 12 shows an alternative method of supplying lubricant by drilled passages 66 through the support column 67 and pad 64 to blind ended grooves 68 which run across the pad face parallel to the alternating leading edges.

The lubricant may be taken conveniently from the supply system to the connecting rod and gudgeon pin.

The third from of reciprocating machine is illustrated in FIGS. 13 to 17. The machine includes a pad 70 having a part-cylindrical rear surface 71 supported in a correspondingly shaped cup 72 in the component 73, the axis of the cylinders 71 and 72 being normal to the direction of motion indicated in this instance by arrow 74. The face of the pad 70 co-operates with a stationary guide surface 75 which may, for example, be a cylinder bore. The pad is located in the cylindrical cup by flanges 76 at each side, but other arrangements may be preferred. The pad is able to tilt by relative sliding of the support surfaces 71 and 72.

It will be appreciated that the rear surface 71 may be of any suitable shape which is convexly curved in planes parallel to the direction of relative motion, with the cup 72 being correspondingly shaped. For example, the surface and the cup may be part-spherical or part of a prolate spheroid.

Figure 15:
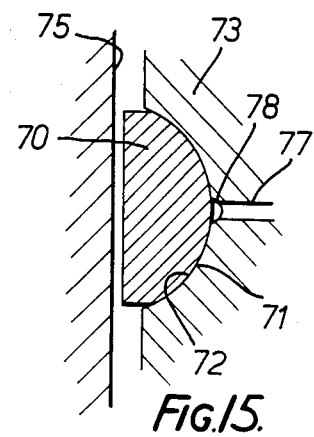

In many applications, such as internal combustion engines, the operating environment will include oil mist and splash, and an oil film will exist between the support surfaces 71 and 72, so that any frictional forces opposing tilting of the pad will be very small. In some applications the film will be adequately maintained by the mist environment and by the squeeze effect when the piston crosses over from one side of the cylinder to the other at the ends of the stroke. In other applications it may be advisable to arrange a supply of pressure lubricant as shown in FIG. 15, where lubricant is supplied through a drilled passage 77 in component 73 to a blind ended groove 78 from which it can spread between the surfaces 71 and 72. This has the additional advantage, in a piston, of damping the bearing pads on the non-load bearing side of the piston during receiprocation, and all the pads and the top and bottom of the stroke, by the supply of lubricant to the cups beneath the pads. This will eliminate or reduce piston slap.

Figure 16:
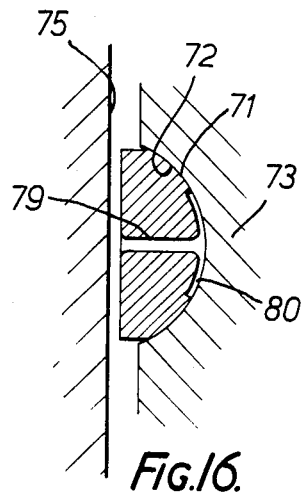

An alternative method is shown in FIG. 16 where a drilled passage 79 through the centre of the pad 70 leads from the face to a recess 80 formed in the back surface of the pad. High pressure lubricant is thus bled from the surface film to the recess 80 where it provides a hydrostatic "lift" to the pad and maintains an oil film between surfaces 71, 72.

Another method is to coat either of the surfaces 71, 72 with an anti-fretting dry lubricant such as, for example polytetrafluoroethylene (p.t.f.e.). Alternatively both surfaces may be treated to obtain optimum co-operative results. For example a piston of aluminium alloy could have the cup surface hard anodised so as to co-operate better with a pad having a plastics surface. Other possible treatments are hardening or plating.

Lubricant would be supplied to the pad face and guide surfaces by one of the means already described.

Figure 17:
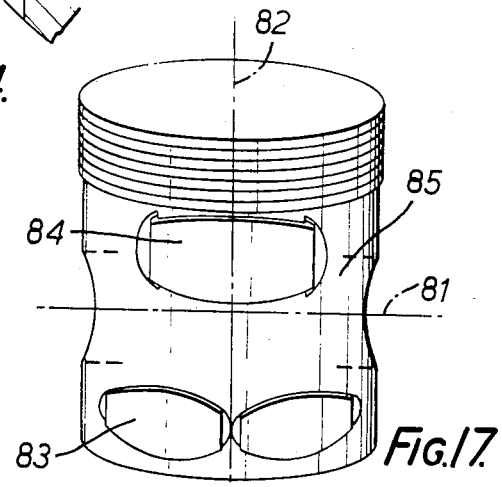

A practical application of this third form of bearing pad to a piston for an internal combustion engine is shown in FIG. 17. Here the lateral forces lying within plane 82 normal to the gudgeon pin axis 81 and acting to each side of it are taken by one larger pad 84 and two smaller pads 83 deployed above and below the axis 81 so that the lateral force is shared proportionately among them. The axis of the cylindrical support surfaces for pad 84 is normal to plane 82 whilst the axes of the support surfaces for pads 83 lie at an angle to each side of plane 82. Corresponding pads (not shown) are provided on the other side of the piston.

This is by way of an example and a piston may have two pads as 84 on each side or four pads as 83 or any suitable multiple or combination. In cases where the piston rotates on its axis during reciprocation one or more rings of pads would be fitted around the circumference of the piston skirt 85.

Figure 14:
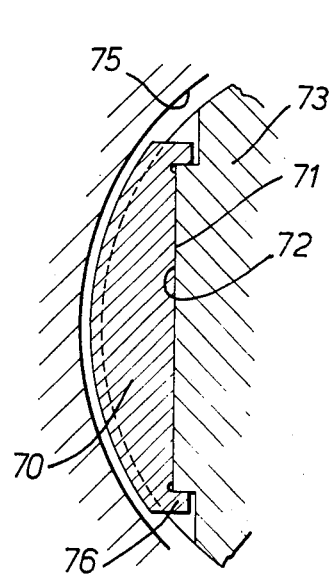

In the case where, as with the pad 84 in FIG. 17, the pad is disposed about a plane including the piston axis 82 but normal to the gudgeon pin bore axis 81, the pad must be guided by flanges, such as shown in FIG. 14, in order to guide the piston. However, if such a pad is replaced by two angularly aligned pads disposed on opposite sides of this plane, then no flanges will be required (although the pads, being loose in the cups, would have to be held in position before the piston was inserted into the cylinder).

This embodiment may equally be applied to crossheads and where they are rigidly attached to a piston rod, as is common practice, the kinematic requirements will be met by one pad for each lateral force. Where not rigidly attached, two or more pads for each side will be needed.

The embodiments described above with reference to the drawings have been applied to pistons and crossheads in engines compressors and like machines so that the examples illustrated all reciprocate in an axial direction in cylindrical bores. However, it is to be understood that they are equally applicable to crossheads operating on flat guide surfaces, and also to reciprocating motion in a curved path as in a cylindrical or annular sector in a plane normal or inclined to the axis.

In the examples quoted the pads are carried on the moving component sliding along a stationary guide surface, but they are equally applicable to an arrangement wherein the pads are carried by a stationary component supporting a surface sliding over them as, for example, a ram or a machine tool table.

The bearing pads may be made of any suitable metallic or plastics material or any combination of these. A preferred material is polyetheretherketone reinforced with carbon or glass fibers. The sliding surface or face of each pad may be treated, or coated with another material to improve the bearing or wear characteristics. For example, pads made of aluminium alloy may have the surface treated with hard anodising or pads for crossheads may be faced with white metal. The guide surfaces may be similarly treated or coated as required.

In all the drawings the thickness of the oil film and the angles of tilt are greatly exaggerated for purposes of clarity. In practice, both are extremely small.

In all the embodiments of the invention described above with reference to the drawings, the use of tilting pads permits an increase in specific loading and therefore a reduction of sliding surface area of an order of 10, resulting in a significant improvement in the overall efficiency of the machine. In the case of an internal combustion engine, it has been estimated that this could provide a fuel saving of 4% for a given power output.

I claim:

1. A piston for an internal combustion engine for lubricated reciprocation in an associated cylinder comprising:
   a crown,
   a ring band,
   a gudgeon pin bore,
   at least two bearing pads provided on opposite sides of the gudgeon pin bore and beneath the ring band, and
   pivotal mounting means interposed between each bearing pad and a part of the piston beneath said ring band, said pivotal mounting means pivoting during reciprocation of said piston for tilting said bearing pads, the tilting reversing as direction of motion reverses during reciprocation, for forming a fluid pressure wedge of lubricant between each bearing pad and the associated cylinder, the instantaneous leading edge of the fluid wedge having the greater thickness.

2. A piston according to claim 1, wherein each bearing pad has a sliding surface which is convexly curved in planes normal to the cylinder and parallel to the direction of motion.

3. A piston according to claim 1, wherein the pivotal mounting means includes at least one flexural connection which deflects to allow the pad to tilt to form said fluid pressure wedge.

4. A piston according to claim 3, wherein the pivotal mounting means includes two flexural connections in the form of two flexural columns connected between the pad and the remainder of the piston, the two flexural columns being spaced in a direction parallel to the direction of relative motion, the lengths of said columns meeting at a point on the opposite side of a face of the pad from the columns.

5. A piston according to claim 1, wherein the pivotal mounting means includes a rear surface of the pad which is convexly curved in planes parallel to the direction of relative motion and a correspondingly shaped cup in the piston, the rear surface of the pad resting in the cup of the piston.

6. A piston according to claim 5, whereinsaid rear surface of each pad is part-cylindrical and rests in a correspondingly shaped cup in the piston, the common axis of said cylinders being generally normal to the direction of relative motion.

7. A piston according to claim 5, wherein a fluid lubricant is introduced between the rear surface of each bearing pad and the cup, from a pressurized supply.

8. A piston according to claim 7, wherein the fluid lubricant is bled from the sliding surface of each bearing pad.

9. A piston according to claim 5, wherein at least one of the curved rear surfaces of each bearing pad and the associated cup is coated with a solid lubricant.

10. A piston according to claim 5, wherein the rear surface of each bearing pad and the corresponding cup are treated to improve the wearing characteristics thereof.

11. A piston according to claim 5, wherein each bearing pad is made of polyetheretherketone reinforced with carbon or glass fibers.

12. A piston according to claim 1, wherein forced lubrication is provided over each bearing pad.

13. A piston according to claim 1, wherein the lubrication over each bearing pad is provided by grooves along the leading edges of each bearing pad and fed from a pressurized source.

14. A piston according to claim 1, wherein there are at least four bearing pads, at least two being arranged on each side of said plane.

15. A piston for an internal combustion engine for lubricated reciprocation in an associated cylinder comprising:
   a crown,
   a ring band,
   a gudgeon pin bore,
   at least two bearing pads provided on opposite sides of the gudgeon pin bore and beneath the ring band,
   means including at least one flexural connection interposed between each bearing pad and a part of the piston beneath said ring band, said flexural connection pivoting during reciprocation of said piston for tilting said bearing pads, the tilting reversing as the direction of motion reverses during reciprocation, for forming a fluid pressure wedge of lubricant between each bearing pad and the associated cylinder, the instantaneous leading edge of the fluid wedge having the greater thickness.

16. The piston according to claim 1 wherein the ring band is disposed around the periphery of the crown and wherein the piston further includes the means operatively connected to the crown for defining the gudgeon pin bore.

17. The piston according to claim 16 wherein the bore defining means includes a skirt and the pivotal mounting means is interposed between each bearing pad and the skirt.

18. The piston according to claim 16 wherein the bore defining means includes a crosshead and the pivotal mounting means is interposed between each bearing pad and the crosshead.

19. The piston according to claim 15 wherein the ring band is disposed around the periphery of the crown and wherein the piston further includes means operatively connected to the crown for defining the gudgeon pin bore.

20. The piston according to claim 19 wherein the bore defining means includes a skirt and the flexural connection is interposed between each bearing pad and the skirt.

21. The piston according to claim 19 wherein the bore defining means includes a skirt and the flexural connection is interposed between each bearing pad and the crosshead.

* * * * *